United States Patent
Lee et al.

(10) Patent No.: US 9,389,859 B2
(45) Date of Patent: Jul. 12, 2016

(54) DEVICE AND METHOD FOR IMPLEMENTING ADDRESS BUFFER MANAGEMENT OF PROCESSOR

(75) Inventors: Lea Hwang Lee, Shenzhen (CN); Chunyu Tian, Shenzhen (CN); Hui Ren, Shenzhen (CN)

(73) Assignee: ZTE CORPORATION, Shenzhen, Guangdong (CN)

(*) Notice: Subject to any disclaimer, the term of this patent is extended or adjusted under 35 U.S.C. 154(b) by 433 days.

(21) Appl. No.: 14/005,719

(22) PCT Filed: Aug. 24, 2011

(86) PCT No.: PCT/CN2011/078815
§ 371 (c)(1),
(2), (4) Date: Sep. 25, 2013

(87) PCT Pub. No.: WO2012/122781
PCT Pub. Date: Sep. 20, 2012

(65) Prior Publication Data
US 2014/0013084 A1    Jan. 9, 2014

(30) Foreign Application Priority Data
Mar. 17, 2011  (CN) .......................... 2011 1 0065349

(51) Int. Cl.
*G06F 9/30* (2006.01)
*G06F 9/345* (2006.01)

(52) U.S. Cl.
CPC .............. *G06F 9/30043* (2013.01); *G06F 9/30* (2013.01); *G06F 9/3455* (2013.01)

(58) Field of Classification Search
CPC ...... G06F 9/3455; G06F 9/30043; G06F 9/30
See application file for complete search history.

(56) References Cited

U.S. PATENT DOCUMENTS

| 7,450,463 | B2 | 11/2008 | Lee |
| 2007/0211555 | A1 | 9/2007 | Lee |

FOREIGN PATENT DOCUMENTS

| CN | 101034587 A | 9/2007 |
| CN | 101124539 A | 2/2008 |

(Continued)

OTHER PUBLICATIONS

International Search Report issued in corresponding application No. PCT/CN2011/078815 on Dec. 8, 2011.

(Continued)

*Primary Examiner* — Farley Abad
(74) *Attorney, Agent, or Firm* — Brundidge & Stanger, P.C.

(57) ABSTRACT

The disclosure provides a device for implementing address buffer management of a processor, including: an assembler configured to perform operations to obtain intermediate values when the assembler encodes a set instruction for an address automatic-increment value and boundary values, and to encapsulate the intermediate values into the set instruction for the address automatic-increment value and boundary values; and a processor configured to determine, according to the intermediate values, whether to perform the address automatic-increment operation or the address automatic-decrement operation, so as to achieve the address buffer management. The disclosure also provides a method for implementing address buffer management of a processor, including: a processor decodes a set instruction for an address automatic-increment value and boundary values to obtain intermediate values, and determines, according to the intermediate values, whether to perform the address automatic-increment operation or the address automatic-decrement operation when the processor performs a load or store instruction, so as to realize the address buffer management. Through the device and the method of the disclosure, the hardware costs of the processor are reduced and design requirements of the processor's time sequence and energy efficiency are met.

12 Claims, 3 Drawing Sheets

(56) References Cited

FOREIGN PATENT DOCUMENTS

| CN | 101256546 A | 9/2008 |
| CN | 101727295 A | 6/2010 |
| CN | 101751244 A | 6/2010 |
| JP | 59172044 A | 9/1984 |

OTHER PUBLICATIONS

English Translation of the Written Opinion of the International Search Authority in International Application No. PCT/CN2011/078815, Dec. 8, 2011.

DEVICE AND METHOD FOR IMPLEMENTING ADDRESS BUFFER MANAGEMENT OF PROCESSOR

TECHNICAL FIELD

The disclosure relates to the field of a processor, and in particular to a device and a method for implementing address buffer management of a processor when the processor loads or stores data.

BACKGROUND

For most of conventional processors, address register file thereof includes a plurality of address registers. In view of algorithmic requirements, there is a corresponding address increment register for each address register. The address register automatically increases or decreases aa_inc after every implementation of the load/store instruction, where the aa_inc is an automatic-increment value or an automatic-decrement value of the address increment register. The load and store instructions can be performed continuously due to the presence of the aa_inc so as to load or store different address data without writing an address operation instruction. Additionally, the address buffer management needs to be implemented in the communication algorithms such as LTE, i.e., to set a leading boundary value and a trailing boundary value of an address register so that the address automatically increases or decreases in a range between the leading boundary value and the trailing boundary value, and automatically returns to the range when the address is out of the range.

The arithmetic logic of a conventional solution for implementing the address buffer management is to set two boundary registers for each address register of which one is a leading boundary register and another is a trailing boundary register, and to set respective values of the two registers through instructions. When a load or store instruction is performed a current address value is added with the automatic-increment value and then is compared with the boundary values, if the increased address value is out of the range between the boundary values, the address will return into the range. The encoding corresponding to the arithmetic logic is classed into two groups as follows:

(1) the encoding in the case that the address automatically increases:

```
if(aa_inc >=0&&aa + aa_inc>aa_end)
    aa=aa+aa_inc-(aa_end-aa_start+1);
else
    aa=aa + aa_inc;
```

(2) the encoding in the case that the address automatically decreases:

```
if(aa_inc < 0&&aa + aa_inc<aa_start)
    aa=aa+aa_inc+(aa_end - aa_start+1);
else
    aa=aa + aa_inc;
``` where aa_inc is the automatic-increment value or the automatic-decrement value of the address increment register (aa_inc is the automatic-increment value of the address increment register when the address automatically increases, and the aa_inc is the automatic-decrement value of the address increment register when the address automatically decreases), the aa_start is the leading boundary value of the address buffer, the aa_end is the trailing boundary value of the address buffer, the aa is the current value of the address register, and (aa_end−aa_start+1) is a buffer size value of the address register.

However, in the conventional solution, the arithmetic logic is performed in a processor. That is, for the following four operations aa+aa_inc>aa_end, aa+aa_inc<aa_start, aa+aa_inc+(aa_end−aa_start+1) and aa+aa_inc−(aa_end−aa_start+1), it is necessary to apply a circuit composed of two adders in series and a two-grade MUX (i.e. a 2-to-1 MUX to implement selective output) on the processor's hardware, so as to implement the address buffer management, wherein the circuit is referred as four key paths shown by heavy lines in FIG. 1. Therefore, it is obvious that the logical circuit of the processor is complex.

Figure 1:
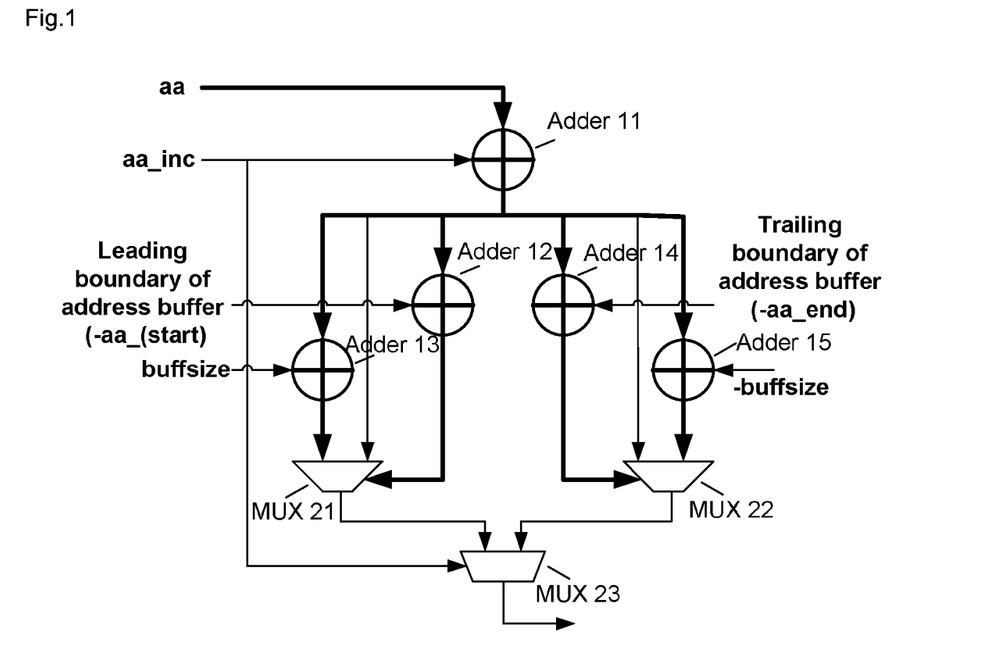
FIG. 1 is a diagram of a logical circuit of a conventional processor.

Specifically, in FIG. 1, ⊕ indicates an adder (to perform an addition operation in the above encoding), ⌵ indicates a MUX (to perform if/else, i.e. the branch selecting operation in the above encoding), which also be referred to as a branch selector, and buffsize=aa_end−aa_start+1. In the solution as shown in FIG. 1, two adders are connected in series, such as an adder 11 is connected in series with an adder 12, and the adder 11 is connected in series with an adder 13. A two-grade MUX circuit is used in FIG. 1, such as a MUX 21 (a MUX 22) and a MUX 23 form the two-grade MUX, that is, the two-grade MUX circuit is used to implement the selective output.

In view of the above, in order to perform serial processing of the logical circuit of the processor, it is necessary to connect two adders in serial, and in order to implement the selective output, it is necessary to use a two-grade MUX circuit. As can be seen, the complex logical operations results in a complex logical circuit of the processor, which increases hardware costs. Moreover, the complex logical operations pull down the frequency of the processor and cause a time sequence problem. And thus, the solution for implementing address buffer management using the conventional processor increases the hardware costs and cannot meet design requirements of the processor's time sequence and energy efficiency.

SUMMARY

Accordingly, one of objects of the disclosure is to provide a device and a method for implementing address buffer management of a processor, so that the hardware costs of the processor is reduced and design requirements of the processor's time sequence and energy efficiency are met.

To this end, one aspect of the disclosure provides a device for implementing address buffer management of a processor, including:

an assembler configured to perform operations to obtain intermediate values when the assembler encodes a set instruction for an address automatic-increment value and boundary values, and to encapsulate the intermediate values into the set instruction for the address automatic-increment value and boundary values, wherein the intermediate values are values for an address automatic-increment operation or an address automatic-decrement operation; and a processor configured to decode the set instruction to obtain the intermediate values, and to determine, according to the intermediate values, whether to perform the address automatic-increment operation or the address automatic-decrement operation when the processor performs a load or store instruction, so as to achieve the address buffer management.

In the above solution, the assembler may include:

an instruction encoding unit configured, when the set instruction for the address automatic-increment value and boundary values received by the assembler is set aa,<aa_inc>, [aa_start,aa_end], to perform operations according to an automatic-increment value or an automatic-decrement value aa_inc of an address register, a trailing boundary value aa_end and a leading boundary value aa_start of the address buffer so as to obtain a first intermediate value aa_wrap and a second intermediate value aa_test; and an instruction encapsulating unit configured to encapsulate the set instruction for the address automatic-increment value and boundary values including the aa_inc, the aa_wrap, and the aa_test as a binary instruction machine code.

In the above solution, the processor may include:

an instruction decoding unit configured to decode the set instruction for the address automatic-increment value and boundary values so as to obtain the aa_inc, the aa_wrap, and the aa_test from the instruction machine code; and an automatic-increment or automatic-decrement operation unit configured, when performing the load or store instruction, to determine, according to the aa_inc, the aa_wrap and the aa_test, whether to perform the address automatic-increment operation or the address automatic-decrement operation so as to achieve the address buffer management.

In an example, the instruction encoding unit may be further configured, in the case of aa_inc>0 where the aa_inc is the automatic-increment value of an address increment register, to perform the following operations to obtain the first intermediate value aa_wrap and the second intermediate value aa_test: aa_wrap=aa_inc−(aa_end−aa_start+1); aa_test=aa_inc−aa_end−1.

Alternatively, the instruction encoding unit may be further configured, in the case of aa_inc<0 where the aa_inc is the automatic-decrement value of the address increment register, to perform the following operations to obtain the first intermediate value aa_wrap and the second intermediate value aa_test: aa_wrap=aa_inc+(aa_end−aa_start+1); aa_test=aa_inc−aa_start.

In an example, the automatic-increment or automatic-decrement operation unit may further configured, after obtaining the aa_wrap and the aa_test, to determine whether a sign bit of the aa_inc is equal to a sign bit of the aa+aa_test so as to achieve the address buffer management, wherein in the case they are equal, aa=aa+aa_wrap, otherwise aa=aa+aa_inc, in which the aa is a current value of the address register.

Another aspect of the disclosure provides a method for implementing address buffer management of a processor, including:

an assembler performs operations to obtain intermediate values when the assembler encodes a set instruction for an address automatic-increment value and boundary values;

the assembler encapsulates the intermediate values into the set instruction, wherein the intermediate values are value for an address automatic-increment operation or an address automatic-decrement operation;

a processor decodes the set instruction to obtain the intermediate values; and when the processor performs a load or store instruction, the processor determines, according to the intermediate values, whether to perform the address automatic-increment operation or the address automatic-decrement operation so as to realize the address buffer management.

In an example, in the case that the set instruction received by the assembler is set aa,<aa_inc>,[aa_start,aa_end], the assembler may perform operations according to an automatic-increment value or an automatic-decrement value aa_inc of an address register, a trailing boundary value aa_end and a leading boundary value aa_start of the address buffer, so as to obtain a first intermediate value aa_wrap and a second intermediate value aa_test.

In an example, when performing the load or store instruction, the processor may determine, according to aa_inc, aa_wrap and aa_test which are obtained through decoding the set instruction, whether to perform the address automatic-increment operation or the address automatic-decrement operation so as to achieve the address buffer management.

In an example, in the case of aa_inc>0 where the aa_inc is the automatic-increment value of an address increment register, the first intermediate value aa_wrap and the second intermediate value aa_test may be obtained from the following operations: aa_wrap=aa_inc−(aa_end−aa_start+1); aa_test=aa_inc−aa_end−1.

In an example, in the case of aa_inc<0 where the aa_inc is the automatic-decrement value of the address increment register, the first intermediate value aa_wrap and the second intermediate value aa_test may be obtained from the following operations: aa_wrap=aa_inc+(aa_end−aa_start+1); aa_test=aa_inc−aa_start.

In an example, after obtaining the aa_wrap and the aa_test, the processer may determine whether a sign bit of the aa_inc is equal to a sign bit of the aa+aa_test so as to achieve the address buffer management, wherein in the case they are equal, aa=aa+aa_wrap, otherwise aa=aa+aa_inc, in which the aa is a current value of the address register.

In the disclosure, the assembler obtains an intermediate value through operations when encoding the set instruction for the address automatic-increment value and boundary values, and then encapsulates the intermediate values into the set instruction. The processor obtains the intermediate values when decoding the set instruction. When performing a load or store instruction, the processor determines, according to the intermediate value, whether to perform the address automatic-increment operation or the address automatic-decrement operation, so as to realize the address buffer management.

The disclosure differs from the conventional art in that not all of arithmetic logic is performed at the processor, instead a part of the arithmetic logic is performed at the assembler to obtain the intermediate value, and the processor only performs the core operations, i.e., to determine according to the intermediate value whether to perform the automatic-increment operation or the automatic-decrement operation, so as to realize the address buffer management. Therefore, the arithmetic logic of the processor is simplified, lowering the hardware costs. Compared with the conventional art, the disclosure does not pull down the frequency of the processor and has no trouble in the time sequence, thus meeting the design requirements of the processor's time sequence and energy economy.

DETAILED DESCRIPTION

The principle of the disclosure is that arithmetic logic is classed into two groups which are respectively implemented in an assembler and a processor. The assembler performs a part of arithmetic logic, which is performed by the processor in the conventional art, to obtain intermediate values. The processor only performs core operations, i.e., uses the intermediate values to perform the address automatic-increment operation or the address automatic-decrement operation, so as to achieve the address buffer management. Therefore, the arithmetic logic of the processor is simplified, lowering the hardware costs of the processor, meeting the design requirements of the processor's time sequence, and improving energy efficiency.

Hereinafter, solutions of the disclosure will be described in detail with reference to drawings.

A device for implementing address buffer management of a processor includes an assembler and a processor.

The assembler is configured to perform operations to obtain intermediate values when encoding a set instruction for an address automatic-increment value and boundary values, and to encapsulate the intermediate values into the set instruction. The intermediate values are values for an address automatic-increment operation or an address automatic-decrement operation for implementing the address buffer management. The processor is configured to obtain the intermediate values when decoding the set instruction for the address automatic-increment value and boundary values, and to determine whether to perform the address automatic-increment operation or the address automatic-decrement operation according to the intermediate values when performing a load or store instruction, so as to achieve the address buffer management.

Additionally, the assembler includes an instruction encoding unit and an instruction encapsulating unit. The instruction encoding unit is configured, when the set instruction for the address automatic-increment value and boundary values received by the assembler is set aa,<aa_inc>,[aa_start, aa_end], to perform operations according to the automatic-increment value or the automatic-decrement value aa_inc of the address register, the trailing boundary value aa_end and the leading boundary value aa_start of the address buffer so as to obtain a first intermediate value aa_wrap and a second intermediate value aa_test. The instruction encapsulating unit is configured to encapsulate the set instruction including the aa_inc, the aa_wrap, and the aa_test as a binary instruction machine code.

Additionally, the processor includes an instruction decoding unit and an automatic-increment/automatic-decrement operation unit. The instruction decoding unit is configured to decode the set instruction for the address automatic-increment value and boundary values so as to obtain the aa_inc, the aa_wrap, and the aa_test from the instruction machine code. The automatic-increment/automatic-decrement operation unit is configured, when the load or store instruction is performed, to determine whether to perform the address automatic-increment operation or the address automatic-decrement operation according to the aa_inc, the aa_wrap and the aa_test so to realize the address buffer management.

Additionally, the instruction encoding unit may be configured, in the case of aa_inc>0 where the aa_inc is the automatic-increment value of the address increment register, to perform the following operations to obtain the first intermediate value aa_wrap and the second intermediate value aa_test: aa_wrap=aa_inc−(aa_end−aa_start+1); aa_test=aa_inc−aa_end−1.

Alternatively, the instruction encoding unit may be configured, in the case of aa_inc<0 where the aa_inc is the automatic-decrement value of the address increment register, to perform the following operations to obtain the first intermediate value aa_wrap and the second intermediate value aa_test: aa_wrap=aa_inc+(aa_end−aa_start+1); aa_test=aa_inc−aa_start.

Additionally, the automatic-increment/automatic-decrement operation unit is configured, after obtaining the aa_wrap and the aa_test, to determine whether the sign bit of the aa_inc value is equal to the sign bit of the aa+aa_test value so as to realize the address buffer management. In the case they are equal, aa=aa+aa_wrap, otherwise aa=aa+aa_inc, in which the aa is a current value of the address register.

A method for implementing address buffer management includes the following steps.

Step 1: an assembler performs operations to obtain intermediate values when encoding a set instruction for an address automatic-increment value and boundary values, and encapsulates the intermediate values into the set instruction. The intermediate values are values for an address automatic-increment operation or an address automatic-decrement operation for implementing the address buffer management.

Step 2: the processor obtains the intermediate values when decoding the set instruction, and determines according to the intermediate values, whether to perform the address automatic-increment operation and the address automatic-decrement operation when executing a load or store instruction, so as to realize the address buffer management.

In an example, in the case that the set instruction received by the assembler is set aa,<aa_inc>,[aa_start,aa_end], the assembler may perform operations according to aa_inc, aa_end and aa_start, so as to obtain a first intermediate value aa_wrap and a second intermediate value aa_test.

In an example, when performing the load or store instruction, the processor may determine, according to aa_inc, aa_wrap and aa_test which are obtained through decoding the set instruction, whether to perform the address automatic-increment operation or the address automatic-decrement operation so as to achieve the address buffer management.

In an example, in the case of aa_inc>0 where the aa_inc is the automatic-increment value of an address increment register, the first intermediate value aa_wrap and the second intermediate value aa_test may be obtained from the following operations: aa_wrap=aa_inc−(aa_end−aa_start+1); aa_test=aa_inc−aa_end−1.

In an example, in the case of aa_inc<0 where the aa_inc is the automatic-decrement value of the address increment register, the first intermediate value aa_wrap and the second intermediate value aa_test may be obtained from the following operations: aa_wrap=aa_inc+(aa_end−aa_start+1); aa_test=aa_inc−aa_start.

In an example, after obtaining the aa_wrap and the aa_test, the processer may determine whether a sign bit of the aa_inc is equal to a sign bit of the aa+aa_test so as to achieve the address buffer management, wherein in the case they are equal, aa=aa+aa_wrap, otherwise aa=aa+aa_inc, in which the aa is a current value of the address register.

In view of the above, the solutions of the disclosure lowers the processor's hardware costs while implements the address buffer management of the processor when the load/store instruction is performed, and design requirements of the processor's time sequence and energy economy are also met. Through the solutions of the disclosure, the arithmetic logic of the processor is simplified, so that the time sequence problem in the conventional processor caused by the complex logic is avoided. In the disclosure, the assembler is used to perform a part of arithmetic logic, and the processor only processes the intermediate values obtained by the assembler. When encoding the load or store instruction, the assembler performs operations on the leading and trailing boundary values of the address buffer, the automatic-increment value and the automatic-decrement value of the address increment register, to obtain two intermediate values and encodes the two intermediate values into an instruction to generate a binary machine code. When decoding the instruction, the processor directly processes the intermediate values, so that the arithmetic logic of the processor is simplified and thus the logical circuit of the processor is simplified. Therefore, it is unnecessary to use the complex logical circuit of the conventional processor where the key path is formed by two adders connected in series and a two-grade MUX circuit, thus meeting design requirements of the processor frequency.

Hereinafter, the disclosure will be described with some examples.

Example of the device for implementing address buffer management

Figure 2:
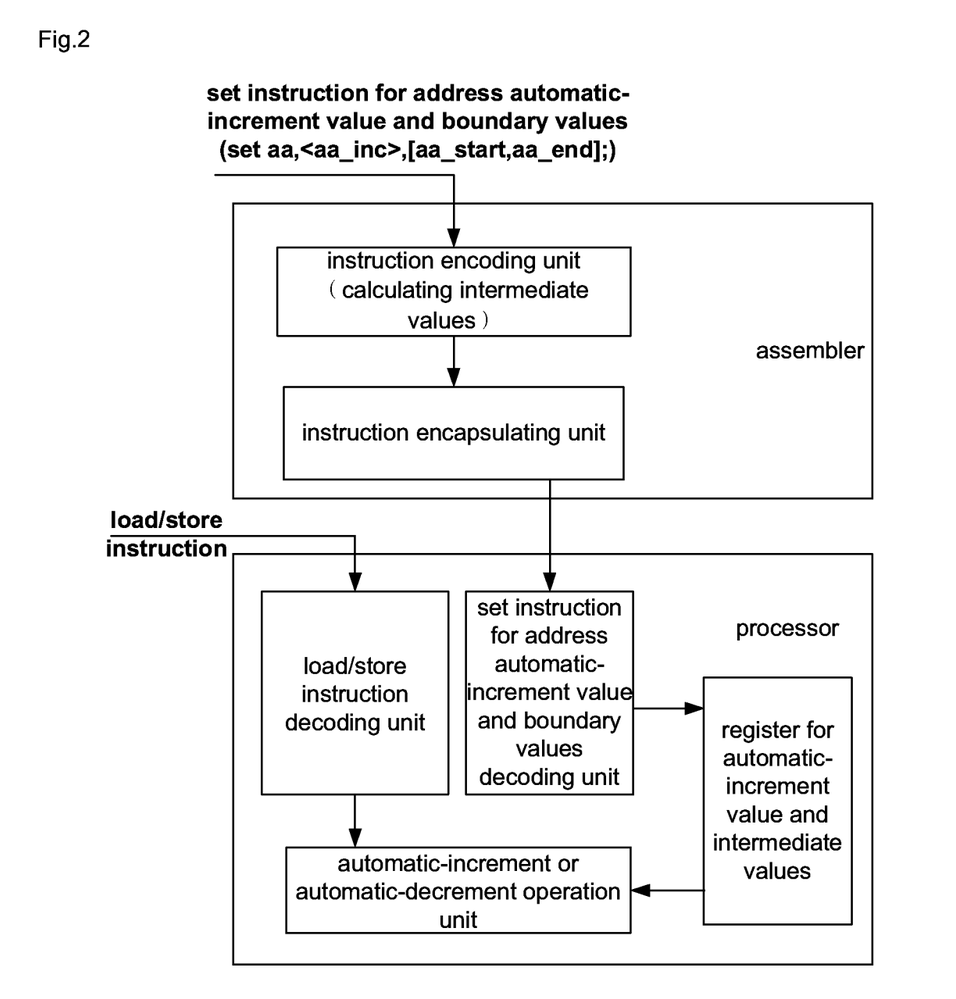
FIG. 2 is a structure diagram of a device for implementing address buffer management according to the disclosure.

FIG. 2 is a structure diagram of a device for implementing address buffer management according to the disclosure, which device includes an assembler and a processor. The instruction for an address automatic-increment value and boundary values (i.e., set aa, <aa_inc>, [aa_start, aa_end]) is processed at the assembler. When the assembler obtains the set instruction—set aa, <aa_inc>, [aa_start,aa_end], the instruction encoding unit is configured to encode the set instruction. To be specific, the instruction encoding unit performs operations according to the automatic-increment value or the automatic-decrement value aa_inc of the address register, the trailing boundary value aa_end and the leading boundary value aa_start of the address buffer so as to obtain the first intermediate value aa_wrap and the second intermediate value aa_test. The instruction encapsulating unit is configured to encapsulate the set instruction including the aa_inc, the aa_wrap, and the aa_test as a binary instruction machine code according to an instruction encapsulation format. To be specific, the instruction encapsulating unit encapsulates <aa_inc>, <aa_wrap>, and <aa_test> into the machine code of the instruction set aa,<aa_inc>,[aa_start, aa_end]. The instruction decoding unit of the processor is composed of the load/store instruction decoding unit and the set instruction (for the address automatic-increment value and boundary values) decoding unit as shown in FIG. 2. The set instruction decoding unit is configured to decode the set instruction for the address automatic-increment value and boundary values so as to obtain the aa_inc and the two intermediate values aa_wrap and aa_test, and to store the aa_inc and the two intermediate values aa_wrap and aa_test in the register (i.e., the register for the automatic-increment value and boundary values as shown in FIG. 2). To be specific, when decoding the instruction set aa,<aa_inc>,[aa_start, aa_end], the set instruction decoding unit directly obtains the <aa_inc>, <aa_wrap>, <aa_test> from the machine code and stores them in a register without performing any operation (each register is corresponding to a set of values of the above <aa_inc>, <aa_wrap>, <aa_test>). The load/store instruction decoding unit is configured to decode the load/store instruction. The automatic-increment/automatic-decrement operation unit in the processor is configured to determine, according to the two intermediate values <aa_wrap> and <aa_test>, whether to perform the address automatic-increment operation or the address automatic-decrement when the load or store instruction is performed, so as to realize the address buffer management. That is, when the load or store instruction is processed, the values of <aa_inc>, <aa_wrap> and <aa_test> in the address register are fetched, and then operations such as determining, addition, selecting are performed.

The arithmetic logic in the embodiment is classed into two parts which are respectively executed in the assembler and the processor. The complex part of the arithmetic logic is performed by the assembler and the remaining part of the arithmetic logic, which is simple, is performed by the processor.

The conventional arithmetic logic is to set two boundary registers for each address register of which one is a leading boundary register and another is a trailing boundary register, and to set respective values of the two registers through instructions. When a load or store instruction is performed, a current address value is added with the automatic-increment value and then is compared with the boundary values, if the increased address value is out of the range between the boundary values, the address will return into the range. In contrast, the arithmetic logic of an embodiment of the disclosure differs from that of the conventional art in that there are the two intermediate values aa_wrap and aa_test of the assembler in the disclosure. Hereinafter, the transformation from the arithmetic logic of the conventional art to the arithmetic logic including the aa_wrap and the aa_test of the disclosure will be described, in which the encoding is classed into two groups, i.e., automatic-increment and automatic-decrement.

(1) the encoding in the case that the address automatically increases:

$$
\begin{aligned}
&\text{if}(aa\_inc > 0 \,\&\&\, aa + aa\_inc > aa\_end) \hspace{2em} (1\text{-}1)\\
&\quad aa = aa + aa\_inc - (aa\_end - aa\_start + 1);\\
&\text{else}\\
&\quad aa = aa + aa\_inc;\\
&\text{if setting: } aa\_test = aa\_inc - aa\_end - 1; \hspace{2em} (1\text{-}2)\\
&\quad aa\_wrap = aa\_inc - (aa\_end - aa\_start + 1); \hspace{2em} (1\text{-}3)
\end{aligned}
$$

the above encoding for if/else branch selecting operation shown in formula (1-1) is transformed into the following encoding for if/else branch selecting operation shown in formula (1-4).

$$
\begin{aligned}
&\text{if}(aa\_inc > 0 \,\&\&\, aa + aa\_test > -1); \hspace{2em} (1\text{-}4)\\
&\quad aa = aa + aa\_wrap;\\
&\text{else}\\
&\quad aa = aa + aa\_inc;\\
&\text{the above is equivalent to:}\\
&\text{if}(aa\_inc > 0 \,\&\&\, aa + aa\_test >= 0) \hspace{2em} (1\text{-}4')\\
&\quad aa = aa + aa\_wrap;\\
&\text{else}\\
&\quad aa = aa + aa\_inc;
\end{aligned}
$$

(2) the encoding in the case that the address automatically decreases:

$$
\begin{aligned}
&\text{if}(aa\_inc < 0 \,\&\&\, aa + aa\_inc < aa\_start) \hspace{2em} (2\text{-}1)\\
&\quad aa = aa + aa\_inc + (aa\_end - aa\_start + 1);\\
&\text{else}\\
&\quad aa = aa + aa\_inc;\\
&\text{if setting: } aa\_test = aa\_inc - aa\_start; \hspace{2em} (2\text{-}2)\\
&\quad aa\_wrap = aa\_inc + (aa\_end - aa\_start + 1); \hspace{2em} (2\text{-}3)
\end{aligned}
$$

the above encoding for if/else branch selecting operation shown in formula (2-1) is transformed into the following encoding for if/else branch selecting operation shown in formula (2-4).

$$\text{if}(aa\_inc < 0 \ \&\&\ aa + aa\_test < 0) \quad (2\text{-}4)$$
$$aa = aa + aa\_wrap;$$
$$\text{else}$$
$$aa = aa + aa\_inc;$$

(3) if the aa_inc is equal to 0, which indicates the aa remains unchanged, then the encoding in the case that the address neither automatically increases nor automatically decreases is as follows.

$$\text{if}(aa\_inc==0)$$

$$aa\_wrap=0; \quad (3\text{-}1)$$

in this case, aa_wrap=0. Therefore, the aa_test may be an arbitrary value, since the results of aa+aa_wrap and aa+aa_inc are always equal to aa regardless of the value of aa+aa_test. As a consequence, the processor does not care whether the aa_inc is equal to 0. This is a special circumstance where the address neither automatically increases nor automatically decreases.

(4) it can be seen from the above logical transformation that the processor directly uses the two intermediate values aa_wrap and aa_test introduced in the assembler to obtain the following encoding for if/else branch selecting operation shown in formula (4-1) from formulas (1-4) or (1-4') and formula (2-4), so as to determine whether to perform the address automatic-increment operation or the address automatic-decrement operation.

$$\text{if}(\text{sign}(aa\_inc) == \text{sign}(aa+aa\_test)) \quad (4\text{-}1)$$
$$aa = aa + aa\_wrap;$$
$$\text{else}$$
$$aa = aa + aa\_inc.$$

In view of the above, at the assembler two intermediate values aa_wrap and aa_test are introduced, which are then directly used by the processer to perform encoding with the if/else branch selecting operation shown in formula (4-1), so as to realize the address buffer management. That is, the address automatically increases or decreases within the range between the preset leading boundary value and the preset trailing boundary value of the address register. When the address is out of the range, it will automatically return to the range.

The intermediate values are introduced in the assembler to transform the conventional arithmetic logic to the arithmetic logic of the disclosure, so that only the if/else branch selecting operation shown in formula (4-1) is performed on the processor when the processor performs the load or store instruction, thus simplified the arithmetic logic of the processor. The processor only needs to determine whether the highest bit (sign bit) of the aa_inc is equal to the highest bit (sign bit) of the aa+aa_test, the comparison between the sign bits, indicated by the above if(sign(aa_inc)==sign(aa+aa_test)), is performed with no aid of any adder, thus avoiding the complex logical circuit of the conventional processor which is composed of two adders connected in series and a two-grade MUX circuit. The hardware logical circuit of the processor in the disclosure is obviously simplified compared with that of the conventional processor.

Application Example

Figure 3:
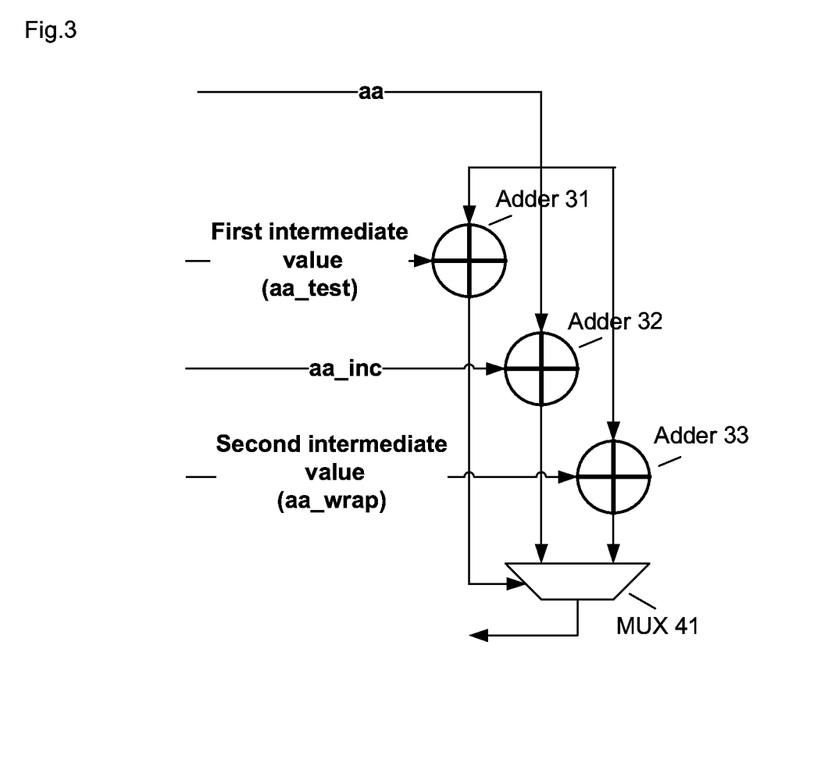
FIG. 3 is a diagram of a logical circuit of a processor according to the disclosure.

FIG. 3 is a diagram of a logical circuit of a processor according to the disclosure. The processor show in FIG. 2 is described based on software function modules. This application example is described based on the hardware circuit configuration. The if/else branch selecting operation, when the load or store instruction is performed, can be performed as long as three variables aa_inc, aa_wrap and aa_test are known, so as to realize the address buffer management. As shown in FIG. 3, adders are connected in parallel, i.e., the adder 31, the adder 32 and the adder 33 are connected in parallel, and the selective output is performed by the MUX 41. As can be seen, there is only one-grade MUX circuit.

In conclusion, the arithmetic logic of the disclosure is composed of two parts respectively performed by the assembler and the processor. The assembler performs the relative complex arithmetic logic, i.e., performs operations according to formulas (1-2), (1-3), (2-2), (2-3) and (3-1) to obtains the intermediate values (in which the operation with formula (3-1), as a specific circumstance, is not always met, thus not often considered). When the assembler encodes the instruction set aa,<aa_inc>,[aa_start,aa_end], the assembler calculates two intermediate values aa_test and aa_wrap from formulas (1-2), (1-3), (2-2) and (2-3) according to the positive or negative value of the aa_inc, and encodes the two intermediate values into the load or store instruction. When decoding the load or store instruction, the processor fetches the values of aa_inc, aa_test and aa_wrap and stores them in the register. The processor performs the simple arithmetic logic. The processor compares sign bits of aa_inc and aa+aa_test when executing a load or store instruction, then updates the value of the aa to ensure aa moves only within the range from the aa_start to the aa_end. The processor implements the address buffer management with the lowest hardware costs, since the logical circuit of the processor is only composed of three adders connected in parallel and one MUX circuit, and moreover the requirements of the processor's time sequence and energy efficiency can be met.

The above are only preferable embodiments of the disclosure and do not intend to define the scope of protection of the disclosure.

The invention claimed is:

1. A device for implementing address buffer management of a processor, comprising:
    an assembler configured to perform operations to obtain intermediate values when the assembler encodes a set instruction for an address automatic-increment value and boundary values, and to encapsulate the intermediate values into the set instruction for the address automatic-increment value and boundary values, wherein the intermediate values are values for an address automatic-increment operation or an address automatic-decrement operation; and
    a processor configured to decode the set instruction to obtain the intermediate values, and to determine, according to the intermediate values, whether to perform the address automatic-increment operation or the address automatic-decrement operation when the processor performs a load or store instruction, so as to achieve the address buffer management.

2. The device according to claim 1, wherein the assembler comprises:
    an instruction encoding unit configured, when the set instruction for the address automatic-increment value and boundary values received by the assembler is set aa,<aa_inc>[aa_start,aa_end], to perform operations according to an automatic-increment value or an automatic-decrement value aa_inc of an address register, a trailing boundary value aa_end and a leading boundary value aa_start of the address buffer so as to obtain a first intermediate value aa_wrap and a second intermediate value aa_test, and an instruction encapsulating unit configured to encapsulate the set instruction for the address automatic-increment value and boundary values including the aa_inc, the aa_wrap, and the aa_test as a binary instruction machine code.

3. The device according to claim 2, wherein the processor comprises:
an instruction decoding unit configured to decode the set instruction for the address automatic-increment value and boundary values so as to obtain the aa_inc, the aa_wrap, and the aa_test from the instruction machine code; and an automatic-increment or automatic-decrement operation unit configured, when performing the load or store instruction, to determine, according to the aa_inc, the aa_wrap and the aa_test, whether to perform the address automatic-increment operation or the address automatic-decrement operation so as to achieve the address buffer management.

4. The device according to claim 3, wherein the instruction encoding unit is further configured, in the case of aa_inc>0 where the aa_inc is the automatic-increment value of an address increment register,
to perform the following operations to obtain the first intermediate value aa_wrap and the second intermediate value aa_test: aa_wrap=aa_inc−(aa_end−aa_start+1); aa_test=aa_inc−aa_end−1, or
wherein the instruction encoding unit is further configured, in the case of aa_inc<0 where the aa_inc is the automatic-decrement value of the address increment register,
to perform the following operations to obtain the first intermediate value aa_wrap and the second intermediate value aa_test: aa_wrap=aa_inc+(aa_end−aa_start+1); aa_test=aa_inc−aa_start.

5. The device according to claim 3, wherein the automatic-increment or automatic-decrement operation unit is further configured, after obtaining the aa_wrap and the aa_test, to determine whether a sign bit of the aa_inc is equal to a sign bit of the aa+aa_test so as to achieve the address buffer management, wherein in the case they are equal, aa=aa+aa_wrap, otherwise aa=aa+aa_inc, in which the aa is a current value of the address register.

6. A method for implementing address buffer management of a processor, comprising:
by an assembler, performing operations to obtain intermediate values when the assembler encodes a set instruction for an address automatic-increment value and boundary values;
by the assembler, encapsulating the intermediate values into the set instruction for the address automatic-increment value and boundary values, wherein the intermediate values are values for an address automatic-increment operation or an address automatic-decrement operation;
by a processor, decoding the set instruction to obtain the intermediate values; and
by the processor, determining, according to the intermediate values, whether to perform the address automatic-increment operation or the address automatic-decrement operation when the processor performs a load or store instruction, so as to achieve the address buffer management.

7. The method according to claim 6, wherein the performing operations to obtain the intermediate values comprises:

in the case that the set instruction for the address automatic-increment value and boundary values received by the assembler is set aa,<aa_inc>[aa_start,aa_end],
performing operations according to an automatic-increment value or an automatic-decrement value aa_inc of an address register, a trailing boundary value aa_end and a leading boundary value aa_start of the address buffer so as to obtain a first intermediate value aa_wrap and a second intermediate value aa_test.

8. The method according to claim 7, wherein
in the case of aa_inc>0 where the aa_inc is the automatic-increment value of an address increment register,
the first intermediate value aa_wrap and the second intermediate value aa_test are obtained from the following operations: aa_wrap=aa_inc−(aa_end−aa_start+1); aa_test=aa_inc−aa_end−1, or
in the case of aa_inc<0 where the aa_inc is the automatic-decrement value of the address increment register,
the first intermediate value aa_wrap and the second intermediate value aa_test are obtained from the following operations: aa_wrap=aa_inc+(aa_end−aa_start+1); aa_test=aa_inc−aa_start.

9. The method according to claim 8, wherein determining, according to aa_inc, aa_wrap and aa_test, whether to perform the address automatic-increment operation or the address automatic-decrement operation so as to achieve the address buffer management, comprises:
after obtaining the aa_wrap and the aa_test, determining whether a sign bit of the aa_inc is equal to a sign bit of the aa+aa_test so as to achieve the address buffer management,
wherein in the case they are equal, aa=aa+aa_wrap,
otherwise aa=aa+aa_inc, in which the aa is a current value of the address register.

10. The method according to claim 6, wherein the determining, according to the intermediate values, whether to perform the address automatic-increment operation or the address automatic-decrement operation when the processor performs a load or store instruction, so as to achieve the address buffer management, comprises:
when performing the load or store instruction, determining, according to aa_inc, aa_wrap and aa_test which are obtained through decoding the set instruction, whether to perform the address automatic-increment operation or the address automatic-decrement operation so as to achieve the address buffer management.

11. The method according to claim 10, wherein
in the case of aa_inc>0 where the aa_inc is the automatic-increment value of an address increment register,
the first intermediate value aa_wrap and the second intermediate value aa_test are obtained from the following operations: aa_wrap=aa_inc−(aa_end-aa_start+1); aa_test=aa_inc−aa_end−1, or
in the case of aa_inc<0 where the aa_inc is the automatic-decrement value of the address increment register,
the first intermediate value aa_wrap and the second intermediate value aa_test are obtained from the following operations: aa_wrap=aa_inc+(aa_end−aa_start+1); aa_test=aa_inc−aa_start.

12. The method according to claim 11, wherein determining, according to aa_inc, aa_wrap and aa_test, whether to perform the address automatic-increment operation or the address automatic-decrement operation so as to achieve the address buffer management, comprises:

after obtaining the aa_wrap and the aa_test, determining whether a sign bit of the aa_inc is equal to a sign bit of the aa+aa_test so as to achieve the address buffer management, wherein in the case they are equal, aa=aa+aa_wrap, otherwise aa=aa+aa_inc, in which the aa is a current value of the address register.

* * * * *